US011881169B2

(12) United States Patent
Kwon et al.

(10) Patent No.: US 11,881,169 B2
(45) Date of Patent: Jan. 23, 2024

(54) PIXEL CAPABLE OF ADJUSTING A THRESHOLD VOLTAGE OF A DRIVING TRANSISTOR

(71) Applicant: Samsung Display Co., Ltd., Yongin-si (KR)

(72) Inventors: Soongi Kwon, Yongin-si (KR); Wonkyu Kwak, Yongin-si (KR); Jihyun Ka, Yongin-si (KR); Chulkyu Kang, Yongin-si (KR); Yangwan Kim, Yongin-si (KR); Kimyeong Eom, Yongin-si (KR); Kyonghwan Oh, Yongin-si (KR); Minku Lee, Yongin-si (KR); Jintae Jeong, Yongin-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 17/970,261

(22) Filed: Oct. 20, 2022

(65) Prior Publication Data

US 2023/0119632 A1 Apr. 20, 2023

(51) Int. Cl.
*G09G 3/3233* (2016.01)

(52) U.S. Cl.
CPC ... *G09G 3/3233* (2013.01); *G09G 2300/0819* (2013.01); *G09G 2300/0842* (2013.01); *G09G 2300/0861* (2013.01)

(58) Field of Classification Search
CPC ......... G09G 3/3233; G09G 2300/0819; G09G 2300/0842; G09G 2300/0861; G09G 2320/0214; G09G 2320/0238; G09G 2340/0435
See application file for complete search history.

(56) References Cited

U.S. PATENT DOCUMENTS

2006/0119548 A1* 6/2006 Lan ...................... G09G 3/3233 345/76
2012/0169798 A1* 7/2012 Ebisuno ................. G09G 3/325 345/77
2016/0042694 A1* 2/2016 Lim ..................... G09G 3/3233 345/78
2016/0307499 A1 10/2016 Toyomura et al.
2016/0351122 A1 12/2016 Jung et al.
(Continued)

FOREIGN PATENT DOCUMENTS

CN 111312174 6/2020
CN 112150967 12/2020
(Continued)

*Primary Examiner* — Premal R Patel
(74) *Attorney, Agent, or Firm* — H.C. Park & Associates, PLC

(57) ABSTRACT

A pixel capable of adjusting a threshold voltage of a driving transistor, the pixel including: a display element configured to emit light during an emission period and including an anode and a cathode, the first transistor including an upper gate and a lower gate and configured to control a magnitude of a driving current flowing to the display element, a storage capacitor connected to the upper gate of the first transistor, and a second transistor configured to be turned on during a data writing period to transmit a data voltage to the first transistor, wherein a lower gate-source voltage of the first transistor has a first voltage level in the data writing period and a second voltage level in the emission period.

16 Claims, 8 Drawing Sheets

(56) References Cited

U.S. PATENT DOCUMENTS

| | | | | |
|---|---|---|---|---|
| 2019/0362674 | A1* | 11/2019 | Xu | G09G 3/3241 |
| 2020/0135091 | A1* | 4/2020 | Kim | G09G 3/32 |
| 2020/0357337 | A1 | 11/2020 | Kim et al. | |
| 2021/0272521 | A1 | 9/2021 | Yoon et al. | |
| 2022/0122522 | A1 | 4/2022 | Li et al. | |

FOREIGN PATENT DOCUMENTS

| | | |
|---|---|---|
| JP | 6818837 | 1/2021 |
| KR | 10-05709950000 | 4/2006 |
| KR | 10-2079839 | 2/2020 |
| KR | 10-2020-0129242 | 11/2020 |

* cited by examiner

PIXEL CAPABLE OF ADJUSTING A THRESHOLD VOLTAGE OF A DRIVING TRANSISTOR

CROSS-REFERENCE TO RELATED APPLICATION

This application claims priority from and the benefit of Korean Patent Application No. 10-2021-0140483, filed on Oct. 20, 2021, which is hereby incorporated by reference for all purposes as if fully set therein.

BACKGROUND

Field

Embodiments of the invention relate to a pixel and a display apparatus.

Discussion of the Background

A display apparatus visually displays data. A display apparatus may be used as a display of a small-sized product such as a mobile phone, or may be used as a display of a large-sized product such as a television.

A display apparatus includes a plurality of pixels receiving electrical signals to emit light to display an image to the outside. Each of the plurality of pixels includes a display element, for example, an organic light-emitting diode in the case of an organic light-emitting display apparatus. Generally, an organic light-emitting display apparatus includes a thin-film transistor and an organic light-emitting diode on a substrate, and the organic light-emitting diode operates by emitting light by itself.

Recently, as the use of display apparatuses has been diversified, various designs have been attempted to improve the quality of the display apparatuses.

The above information disclosed in this Background section is only for understanding of the background of the inventive concepts, and, therefore, it may contain information that does not constitute prior art.

SUMMARY

One or more embodiments of the invention provide a pixel capable of adjusting a threshold voltage of a driving transistor, and a display apparatus.

Additional features of the inventive concepts will be set forth in the description which follows, and in part will be apparent from the description, or may be learned by practice of the inventive concepts.

An embodiment of the invention provides a pixel including a display element configured to emit light during an emission period and including an anode and a cathode, a first transistor including an upper gate and a lower gate and configured to control a magnitude of a driving current flowing to the display element, a storage capacitor connected to the upper gate of the first transistor, and a second transistor configured to be turned on during a data writing period to transmit a data voltage to the first transistor. A lower gate-source voltage of the first transistor has a first voltage level in the data writing period and a second voltage level in the emission period.

The first voltage level may be less than the second voltage level.

The lower gate of the first transistor may be connected to a voltage line configured to transmit a bias voltage.

The pixel may further include a third transistor configured to be turned on during the emission period to transmit a driving voltage to a drain of the first transistor, and a fourth transistor configured to be turned on during the emission period to connect a source of the first transistor to the anode of the display element.

The lower gate of the first transistor may be connected to the anode of the display element.

The pixel may further include a fifth transistor configured to be turned on during the data writing period to connect the upper gate and the drain of the first transistor to each other, a sixth transistor configured to be turned on during a first initialization period to transmit a reference voltage to the upper gate of the first transistor, and a seventh transistor configured to be turned on during a second initialization period to transmit an initialization voltage to the anode of the display element. The second transistor may be configured to transmit the data voltage to the source of the first transistor.

The second initialization period may include the data writing period.

The second initialization period may further include the first initialization period.

The storage capacitor may include a first electrode connected to the upper gate of the first transistor and a second electrode connected to the anode of the display element.

The first transistor may include an n-type metal-oxide-semiconductor field-effect transistor (MOSFET).

The first transistor may include a lower gate electrode operating as the lower gate, a semiconductor layer on the lower gate electrode, and an upper gate electrode arranged on the semiconductor layer and operating as the upper gate.

The semiconductor layer may include an oxide semiconductor material.

Another embodiment of the invention provides a pixel including a display element configured to emit light during an emission period and including an anode and a cathode, a driving transistor including an upper gate and a lower gate and configured to control a magnitude of a driving current flowing to the display element, a storage capacitor connected to the upper gate of the driving transistor, a scan transistor configured to be turned on during a data writing period to transmit a data voltage to the driving transistor, and a voltage applying circuit configured to apply a first voltage to the lower gate of the driving transistor during the data writing period and apply a second voltage to the lower gate of the driving transistor during the emission period.

The voltage applying circuit may be configured to apply an initialization voltage as the first voltage to the lower gate of the driving transistor during the data writing period, and apply an anode voltage of the display element as the second voltage to the lower gate of the driving transistor during the emission period.

The anode voltage of the display element may be substantially equal to a source voltage of the driving transistor during the emission period.

The driving transistor may include an n-type MOSFET.

The driving transistor may include a lower gate electrode operating as the lower gate, a semiconductor layer on the lower gate electrode, and an upper gate electrode arranged on the semiconductor layer and operating as the upper gate.

The semiconductor layer may include an oxide semiconductor material.

Another embodiment of the invention provides a display apparatus including a substrate extending in a first direction and a second direction, and a plurality of pixels arranged on the substrate in the first direction and the second direction and including the pixel described above.

The first voltage level may be less than the second voltage level.

Another embodiment of the invention provides a pixel connected to a data line, a power line, a first voltage line, and a second voltage line, the pixel including a display element comprising an anode and a cathode, a first transistor comprising an upper gate, a lower gate, a drain, and a source connected to the lower gate and configured to control a magnitude of a driving current flowing to the display element, a storage capacitor comprising a first electrode connected to the upper gate of the first transistor and a second electrode, a second transistor connected between the data line and the first transistor, a fourth transistor connected between the first voltage line and the upper gate of the first transistor, a fifth transistor connected between the power line and the drain of the first transistor, a sixth transistor connected between the source of the first transistor and the anode of the display element, and a seventh transistor connected between the second electrode of the storage capacitor and the second voltage line.

The pixel may further include a third transistor connected between the upper gate of the first transistor and the drain of the first transistor. The second transistor may be connected between the data line and the source of the first transistor.

The same emission control signal may be applied to a gate of the fifth transistor and a gate of the sixth transistor.

The second electrode of the storage capacitor may be connected to the anode of the display element.

The first transistor, the second transistor, the fourth transistor, the fifth transistor, the sixth transistor, and the seventh transistor may be NMOS transistors.

It is to be understood that both the foregoing general description and the following detailed description are illustrative and explanatory and are intended to provide further explanation of the invention as claimed.

These general and specific aspects may be embodied using a system, method, computer program, or a combination of any system, method, and computer program.

BRIEF DESCRIPTION OF THE DRAWINGS

The accompanying drawings, which are included to provide a further understanding of the invention and are incorporated in and constitute a part of this specification, illustrate illustrative embodiments of the invention, and together with the description serve to explain the inventive concepts.

DETAILED DESCRIPTION

Figure 1:
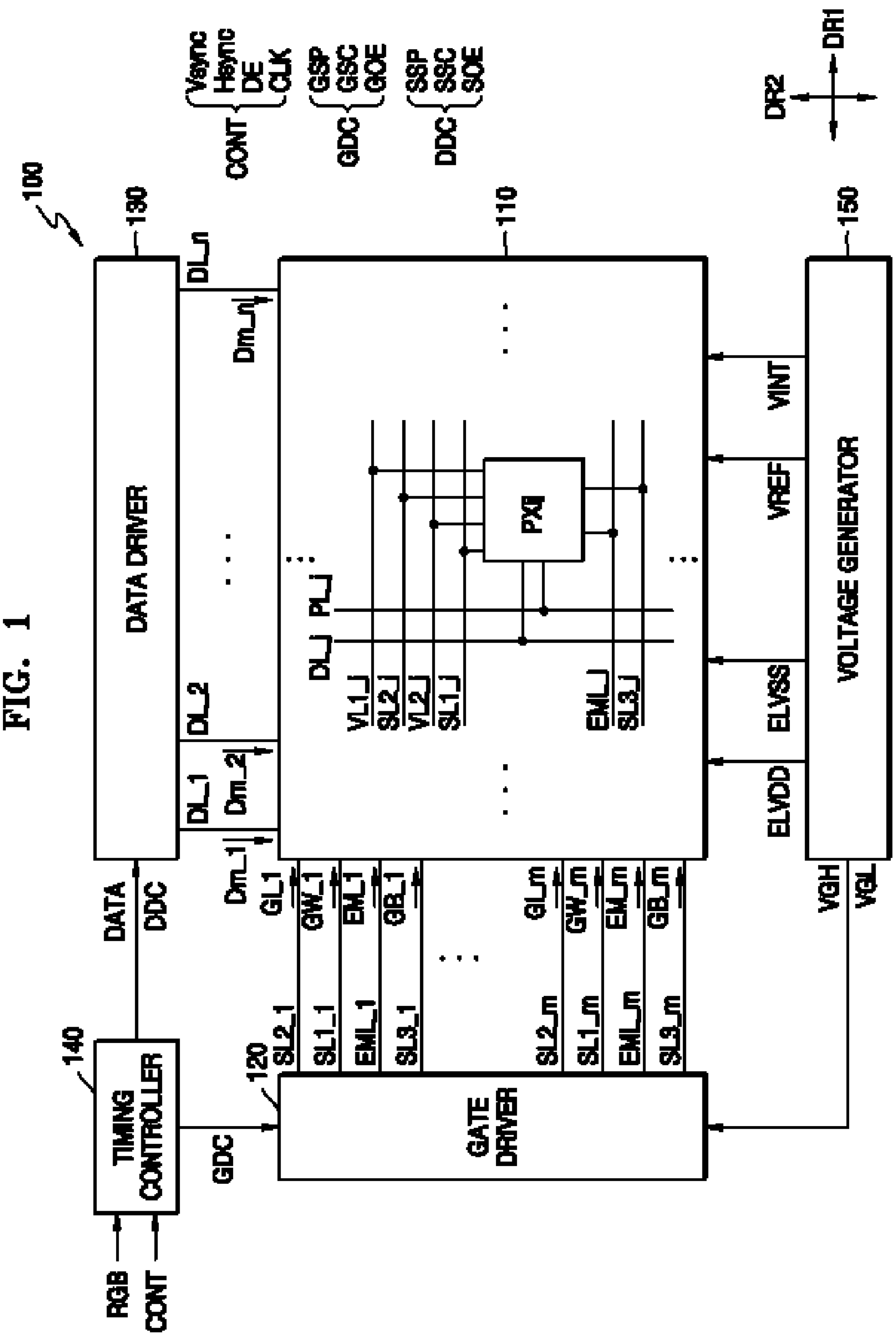
FIG. 1 is a schematic block diagram of a display apparatus according to an embodiment.

In the following description, for the purposes of explanation, numerous specific details are set forth in order to provide a thorough understanding of various embodiments or implementations of the invention. As used herein "embodiments" and "implementations" are interchangeable words that are non-limiting examples of devices or methods employing one or more of the inventive concepts disclosed herein. It is apparent, however, that various embodiments may be practiced without these specific details or with one or more equivalent arrangements. In other instances, well-known structures and devices are shown in block diagram form in order to avoid unnecessarily obscuring various embodiments. Further, various embodiments may be different, but do not have to be exclusive. For example, specific shapes, configurations, and characteristics of an embodiment may be used or implemented in another embodiment without departing from the inventive concepts.

Unless otherwise specified, the illustrated embodiments are to be understood as providing illustrative features of varying detail of some ways in which the inventive concepts may be implemented in practice. Therefore, unless otherwise specified, the features, components, modules, layers, films, panels, regions, and/or aspects, etc. (hereinafter individually or collectively referred to as "elements"), of the various embodiments may be otherwise combined, separated, interchanged, and/or rearranged without departing from the inventive concepts.

The use of cross-hatching and/or shading in the accompanying drawings is generally provided to clarify boundaries between adjacent elements. As such, neither the presence nor the absence of cross-hatching or shading conveys or indicates any preference or requirement for particular materials, material properties, dimensions, proportions, commonalities between illustrated elements, and/or any other characteristic, attribute, property, etc., of the elements, unless specified. Further, in the accompanying drawings, the size and relative sizes of elements may be exaggerated for clarity and/or descriptive purposes. When an embodiment may be implemented differently, a specific process order may be performed differently from the described order. For example, two consecutively described processes may be performed substantially at the same time or performed in an order opposite to the described order. Also, like reference numerals denote like elements.

When an element, such as a layer, is referred to as being "on," "connected to," or "coupled to" another element or layer, it may be directly on, connected to, or coupled to the other element or layer or intervening elements or layers may be present. When, however, an element or layer is referred to as being "directly on," "directly connected to," or "directly coupled to" another element or layer, there are no intervening elements or layers present. To this end, the term "connected" may refer to physical, electrical, and/or fluid connection, with or without intervening elements. Further, the D1-axis, the D2-axis, and the D3-axis are not limited to three axes of a rectangular coordinate system, such as the x, y, and z-axes, and may be interpreted in a broader sense. For example, the D1-axis, the D2-axis, and the D3-axis may be perpendicular to one another, or may represent different directions that are not perpendicular to one another. For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. As used herein, the term "and/or" includes any and all combinations of one or more of the associated listed items.

Although the terms "first," "second," etc. may be used herein to describe various types of elements, these elements should not be limited by these terms. These terms are used to distinguish one element from another element. Thus, a first element discussed below could be termed a second element without departing from the teachings of the disclosure.

Spatially relative terms, such as "beneath," "below," "under," "lower," "above," "upper," "over," "higher," "side" (e.g., as in "sidewall"), and the like, may be used herein for descriptive purposes, and, thereby, to describe one elements relationship to another element(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the term "below" can encompass both an orientation of above and below. Furthermore, the apparatus may be otherwise oriented (e.g., rotated 90 degrees or at other orientations), and, as such, the spatially relative descriptors used herein interpreted accordingly.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof. It is also noted that, as used herein, the terms "substantially," "about," and other similar terms, are used as terms of approximation and not as terms of degree, and, as such, are utilized to account for inherent deviations in measured, calculated, and/or provided values that would be recognized by one of ordinary skill in the art.

Various embodiments are described herein with reference to sectional and/or exploded illustrations that are schematic illustrations of idealized embodiments and/or intermediate structures. As such, variations from the shapes of the illustrations as a result, for example, of manufacturing techniques and/or tolerances, are to be expected. Thus, embodiments disclosed herein should not necessarily be construed as limited to the particular illustrated shapes of regions, but are to include deviations in shapes that result from, for instance, manufacturing. In this manner, regions illustrated in the drawings may be schematic in nature and the shapes of these regions may not reflect actual shapes of regions of a device and, as such, are not necessarily intended to be limiting.

As is customary in the field, some embodiments are described and illustrated in the accompanying drawings in terms of functional blocks, units, and/or modules. Those skilled in the art will appreciate that these blocks, units, and/or modules are physically implemented by electronic (or optical) circuits, such as logic circuits, discrete components, microprocessors, hard-wired circuits, memory elements, wiring connections, and the like, which may be formed using semiconductor-based fabrication techniques or other manufacturing technologies. In the case of the blocks, units, and/or modules being implemented by microprocessors or other similar hardware, they may be programmed and controlled using software (e.g., microcode) to perform various functions discussed herein and may optionally be driven by firmware and/or software. It is also contemplated that each block, unit, and/or module may be implemented by dedicated hardware, or as a combination of dedicated hardware to perform some functions and a processor (e.g., one or more programmed microprocessors and associated circuitry) to perform other functions. Also, each block, unit, and/or module of some embodiments may be physically separated into two or more interacting and discrete blocks, units, and/or modules without departing from the scope of the inventive concepts. Further, the blocks, units, and/or modules of some embodiments may be physically combined into more complex blocks, units, and/or modules without departing from the scope of the inventive concepts.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and should not be interpreted in an idealized or overly formal sense, unless expressly so defined herein.

FIG. 1 is a schematic block diagram of a display apparatus according to an embodiment.

The display apparatus may be an organic light-emitting display apparatus including a display element, in which the brightness thereof is changed by a current, for example, an organic light-emitting diode (OLED). Alternatively, the display apparatus may be an inorganic light-emitting display apparatus or an inorganic electroluminescence (EL) display apparatus, or a quantum dot light-emitting display apparatus. That is, an emission layer of a display element included in the display apparatus may include an organic material, an inorganic material, a quantum dot, an organic material and a quantum dot, an inorganic material and a quantum dot, or an organic material, an inorganic material, and a quantum dot. Hereinafter, a case in which the display apparatus is an organic light-emitting display apparatus will be mainly described.

Referring to FIG. 1, an organic light-emitting display apparatus 100 includes a display unit 110, a gate driver 120, a data driver 130, a timing controller 140, and a voltage generator 150.

The display unit 110 includes pixels PX such as a pixel PXij positioned in an i-th row and a j-th column. For ease of understanding, only one pixel PXij is illustrated in FIG. 1, but m×n pixels PX may be arranged, for example, in a matrix form. Here, i is a natural number of 1 or more and m or less, and j is a natural number of 1 or more and n or less.

The pixels PX are connected to first scan lines SL1_1 to SL1_*m*, second scan lines SL2_1 to SL2_*m*, emission control lines EML_1 to EML_m, third scan lines SL3_1 to SL3_*m*, and data lines DL_1 to DL_n. The pixels PX are connected to power lines PL_1 to PL_n, first voltage lines VL_1 to VL1_*m*, and second voltage lines VL2_1 to VL2_*m*. For example, as shown in FIG. 1, the pixel PXij positioned in the i-th row and the j-th column may be connected to a first scan line SL1_*i*, a second scan line SL2_*i*, an emission control line EML_i, a third scan line SL3_*i*, a data line DL_j, a power line PL_j, first voltage line VL1 and a second voltage line VL2_*i*.

The first scan lines SL1_1 to SL1_*m*, the second scan lines SL2_1 to SL2_*m*, the emission control lines EML_1 to EML_m, the third scan lines SL3_1 to SL3_*m*, the first voltage lines VL1_1 to VL1_*m*, and the second voltage lines VL2_1 to VL2_*m* may extend in a first direction DR1 (e.g., a row direction) and may be connected to the pixels PX positioned in the same row. The data lines DL_1 to DL_n and the power lines PL_1 to PL_n may extend in a second direction DR2 (e.g., a column direction) and may be connected to the pixels PX positioned in the same column.

The first scan lines SL1_1 to SL1_*m* are respectively configured to transmit first scan signals GW_1 to GW_m output from the gate driver 120 to the pixels PX positioned in the same row, the second scan lines SL2_1 to SL2_*m* are respectively configured to transmit second scan signals GI_1 to GI_m output from the gate driver 120 to the pixels PX positioned in the same row, and the third scan lines SL3_1 to SL3_*m* are respectively configured to transmit third scan signals GB_1 to GB_m output from the gate driver 120 to the pixels PX positioned in the same row.

The emission control lines EML_1 to EML_m are respectively configured to transmit emission control signals EM_1 to EM_m output from the gate driver 120 to the pixels PX positioned in the same row. The data lines DL_1 to DL_n are respectively configured to transmit data voltages Dm_1 to Dm_n output from the data driver 130 to the pixels PX positioned in the same column. The pixel PXij positioned in the i-th row and the j-th column receives first to third scan signals GW_i, GI_i, and GB_i, a data voltage Dm_j, and an emission control signal EM_i.

Each of the power lines PL_1 to PL_n is configured to transmit a first driving voltage ELVDD output from the voltage generator 150 to the pixels PX positioned in the same column. Each of the first voltage lines VL1_1 to VL1_*m* is configured to transmit a reference voltage VREF output from the voltage generator 150 to the pixels PX positioned in the same row. Each of the second voltage lines VL2_1 to VL2_*m* is configured to transmit an initialization voltage VINT output from the voltage generator 150 to the pixels PX positioned in the same row.

The pixel PXij includes a display element, and a driving transistor that controls a magnitude of a current flowing to the display element based on the data voltage Dm_j. The data voltage Dm_j is output from the data driver 130 and received by the pixel PXij via the data line DL_j. The display element may be, for example, an organic light-emitting diode. When the display element emits light with a brightness corresponding to a magnitude of a current received from the driving transistor, the pixel PXij may express a gray level corresponding to the data voltage Dm_j. The pixel PX may correspond to a portion of a unit pixel which may display a full color, for example, a sub-pixel. The pixel PXij may further include at least one switching transistor and at least one capacitor. The pixel PXij will be described in more detail below.

The voltage generator 150 may generate voltages necessary for driving the pixel PXij. For example, the voltage generator 150 may generate the first driving voltage ELVDD, a second driving voltage ELVSS, the reference voltage VREF, and the initialization voltage VINT. A level of the first driving voltage ELVDD may be greater than a level of the second driving voltage ELVSS. A level of the reference voltage VREF may be greater than a level of the initialization voltage VINT. The level of the initialization voltage VINT may be greater than the level of the second driving voltage ELVSS. A difference between the initialization voltage VINT and the second driving voltage ELVSS may be less than a threshold voltage required for the display element of the pixel PX to emit light. The level of the reference voltage VREF may be different from the level of the first driving voltage ELVDD. For example, the level of the reference voltage VREF may be less than the level of the first driving voltage ELVDD. As another example, the level of the reference voltage VREF may be equal to the level of the first driving voltage ELVDD.

The voltage generator 150 may generate a first gate voltage VGH and a second gate voltage VGL for controlling the at least one switching transistor of the pixel PXij and provide the generated first gate voltage VGH and the second gate voltage VGL to the gate driver 120. When the first gate voltage VGH is applied to a gate of the at least one switching transistor, the at least one switching transistor may be turned on, and when the second gate voltage VGL is applied to the at least one switching transistor, the at least one switching transistor may be turned off. The first gate voltage VGH may be referred to as a gate-on voltage, and the second gate voltage VGL may be referred to as a gate-off voltage. The at least one switching transistor of the pixel PXij may be n-type metal-oxide-semiconductor field-effect transistors (MOSFET), and a level of the first gate voltage VGH may be greater than a level of the second gate voltage VGL. Although not illustrated in FIG. 1, the voltage generator 150 may also generate gamma reference voltages and provide the same to the data driver 130.

The timing controller 140 may control the display unit 110 by controlling operation timings of the gate driver 120 and the data driver 130. The pixels PX of the display unit 110 may receive a new data voltage Dm for each frame period and emit light with a luminance corresponding to the data voltage Dm, thereby displaying an image corresponding to image source data RGB of one frame. According to an embodiment, one frame period may include a gate initialization period, a data writing period, an anode initialization period, and an emission period. In the gate initialization period, the reference voltage VREF may be applied to the pixels PX in synchronization with a second scan signal GI. In the data writing period, the data voltage Dm may be provided to the pixels PX in synchronization with a first scan signal GW. In the anode initialization period, the initialization voltage VINT may be applied to the pixels PX in synchronization with a third scan signal GB. In the emission period, the pixels PX of the display unit 110 emit light.

The timing controller 140 receives the image source data RGB and a control signal CONT from the outside. The timing controller 140 may convert the image source data RGB into image data DATA based on the display unit 110 and characteristics of the pixels PX. The timing controller 140 may provide the image data DATA to the data driver 130.

The control signal CONT may include a vertical synchronization signal Vsync, a horizontal synchronization signal Hsync, a data enable signal DE, and a clock signal CLK. The timing controller 140 may control the operation timings of the gate driver 120 and the data driver 130 by using the control signal CONT. The timing controller 140 may determine a frame period by counting the data enable signal DE of one horizontal scanning period. In this case, the vertical synchronization signal Vsync and the horizontal synchronization signal Hsync supplied from the outside may be omitted. The image source data RGB may include luminance information of the pixels PX. A luminance may have a predetermined number, for example, $1024(=2^{10})$, $256(=2^8)$, or $64(=2^6)$ grayscales.

The timing controller 140 may generate control signals including a gate timing control signal GDC for controlling an operation timing of the gate driver 120, and a data timing control signal DDC for controlling an operating timing of the data driver 130.

The gate timing control signal GDC may include a gate start pulse GSP, a gate shift clock GSC, a gate output enable signal GOE, or the like. The gate start pulse GSP is supplied to the gate driver 120 that generates a first scan signal at a start time of a scan period. The gate shift clock GSC is a clock signal commonly input to the gate driver 120 and is a clock signal for shifting the gate start pulse GSP. The gate output enable signal GOE controls an output of the gate driver 120.

The data timing control signal DDC may include a source start pulse SSP, a source sampling clock SSC, a source output enable signal SOE, or the like. The source start pulse SSP controls a data sampling start time of the data driver 130, and is provided to the data driver 130 at the start time of the scan period. The source sampling clock SSC is a clock signal that controls a sampling operation of data in the data driver 130 based on a rising or falling edge. The source output enable signal SOE controls an output of the data driver 130. The source start pulse SSP supplied to the data driver 130 may also be omitted depending on a data transmission method.

The gate driver 120 may sequentially generate the first scan signals GW_1 to GW_m, the second scan signals GI_1 to GI_m, and the third scan signals GB_1 to GB_m in response to the gate timing control signal GDC supplied from the timing controller 140 by using the first and second gate voltages VGH and VGL provided from the voltage generator 150.

The data driver 130 samples and latches the image data DATA supplied from the timing controller 140 in response to the data timing control signal DDC supplied from the timing controller 140 to convert the image data DATA into data of a parallel data system. When converting the image data DATA into the data of the parallel data system, the data driver 130 converts the image data DATA into a gamma reference voltage to convert the same into an analog data voltage. The data driver 130 provides the data voltages Dm_1 to Dm_n to the pixels PX via the data lines DL_1 to DL_n, respectively. The pixels PX receive the data voltages Dm_1 to Dm_n in response to the first scan signals GW_1 to GW_m, respectively.

Figure 2:
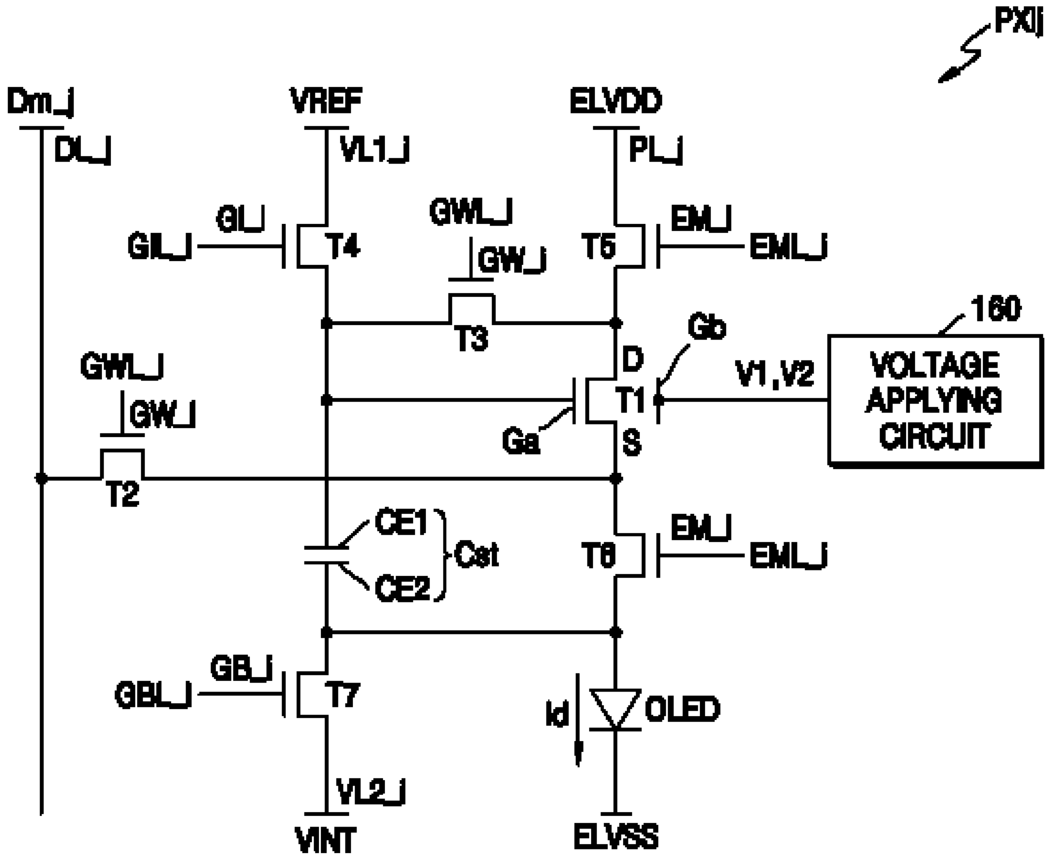
FIG. 2 is an equivalent circuit diagram of a pixel according to an embodiment.

FIG. 2 is an equivalent circuit diagram of the pixel PXij according to an embodiment.

Referring to FIG. 2, the pixel PXij is connected to first to third scan lines GWL_i, GIL_i, and GBL_i respectively configured to transmit the first to third scan signals GW GI_i, and GB_i, the data line DL_j configured to transmit the data voltage Dm_j, and the emission control line EML_i configured to transmit the emission control signal EM_i. The pixel PXij is connected to the power line PL_j configured to transmit the first driving voltage ELVDD, the first voltage line VL1_*i* configured to transmit the reference voltage VREF, and the second voltage line VL2_*i* configured to transmit the initialization voltage VINT. The pixel PXij is connected to a common electrode to which the second driving voltage ELVSS is applied. The pixel PXij may correspond to the pixel PXij of FIG. 1.

The first scan line GWL_i corresponds to the first scan line SL1_*i* of FIG. 1, the second scan line GIL_i corresponds to the second scan line SL2_*i* of FIG. 1, and the third scan line GBL_i corresponds to the third scan line SL3_*i* of FIG. 1.

The pixel PXij includes a display element OLED, first to seventh transistors T1 to T7, a storage capacitor Cst, and a voltage applying circuit 160. The display element OLED may be an organic light-emitting diode having an anode and a cathode. The cathode may be a common electrode to which the second driving voltage ELVSS is applied.

The first transistor T1 may be a driving transistor in which a magnitude of a drain current thereof is determined according to a gate-source voltage, and the second to seventh transistors T2 to T7 may each be a switching transistor which is turned on/off according to a gate-source voltage and substantially a gate voltage. The first to seventh transistors T1 to T7 may each include a thin-film transistor. The first to seventh transistors T1 to T7 may each include an n-channel MOSFET.

The first transistor T1 may be referred to as a driving transistor, the second transistor T2 may be referred to as a scan transistor, the third transistor T3 may be referred to as a compensation transistor, the fourth transistor T4 may be referred to as a gate initialization transistor, the fifth transistor T5 may be referred to as a first emission control transistor, the sixth transistor T6 may be referred to as a second emission control transistor, and the seventh transistor T7 may be referred to as an anode initialization transistor.

The storage capacitor Cst is connected between an upper gate Ga of the driving transistor T1 and an anode of the display element OLED. The storage capacitor Cst may have a first electrode CE1 connected to the upper gate Ga of the driving transistor T1, and a second electrode CE2 connected to the anode of the display element OLED.

The driving transistor T1 may control a magnitude of a driving current Id flowing to the display element OLED. The display element OLED may receive the driving current Id from the driving transistor T1 and emit light with a brightness according to the magnitude of the driving current Id. The driving transistor T1 may have the upper gate Ga connected to the first electrode CE1 of the storage capacitor Cst, a drain D connected to the power line PL_j via the first emission control transistor T5, a source S connected to the display element OLED via the second emission control transistor T6, and a lower gate Gb connected to the voltage applying circuit 160.

The voltage applying circuit 160 may apply a first voltage V1 to the lower gate Gb of the driving transistor T1 during a data writing period, and apply a second voltage V2 to the lower gate Gb of the driving transistor T1 during an emission period. For example, the voltage applying circuit 160 may apply the initialization voltage VINT as the first voltage V1 to the lower gate Gb of the driving transistor T1 during the data writing period. The voltage applying circuit 160 may apply an anode voltage of the display element OLED, that is, a voltage of an anode electrode, as the second voltage V2 to the lower gate Gb of the driving transistor T1 during the emission period. The anode voltage of the display element OLED and a source voltage of the driving transistor T1 may be substantially the same during the emission period.

The scan transistor T2 may connect the data line DL_j to the driving transistor T1 in response to a first scan signal GW_i. The scan transistor T2 may be configured to transmit the data voltage Dm_j to the driving transistor T1 in response to the first scan signal GW_i. For example, the scan transistor T2 may connect the data line DL_j to the source S of the driving transistor T1 in response to the first scan signal GW_i. The scan transistor T2 may be configured to transmit the data voltage Dm_j to the source S of the driving transistor T1 in response to the first scan signal GW_i.

The compensation transistor T3 may connect the drain D and the upper gate Ga of the driving transistor T1 to each other in response to the first scan signal GW_i. The compensation transistor T3 may be connected in series between the drain D and the upper gate Ga of the driving transistor T1.

The gate initialization transistor T4 may connect the first voltage line VL1_*i* to the upper gate Ga of the driving transistor T1 in response to the second scan signal GI_i. The gate initialization transistor T4 may apply the reference voltage VREF to the upper gate Ga of the driving transistor T1 in response to the second scan signal GI_i.

The first emission control transistor T5 may connect the power line PL_j to the drain D of the driving transistor T1 in response to the emission control signal EM_i. The first emission control transistor T5 may connect the power line PL_j and the drain D of the driving transistor T1 to each other in response to the emission control signal EM_i.

The second emission control transistor T6 may connect the source S of the driving transistor T1 to the anode of the display element OLED in response to the emission control signal EM_i. The second emission control transistor T6 may connect the source S of the driving transistor T1 and the anode of the display element OLED to each other in response to the emission control signal EM_i.

The anode initialization transistor T7 may connect the second voltage line VL2_*i* to the anode of the display element OLED in response to the third scan signal GB_i. The anode initialization transistor T7 may apply the initialization voltage VINT to the anode of the display element OLED in response to the third scan signal GB_i.

Figure 3:
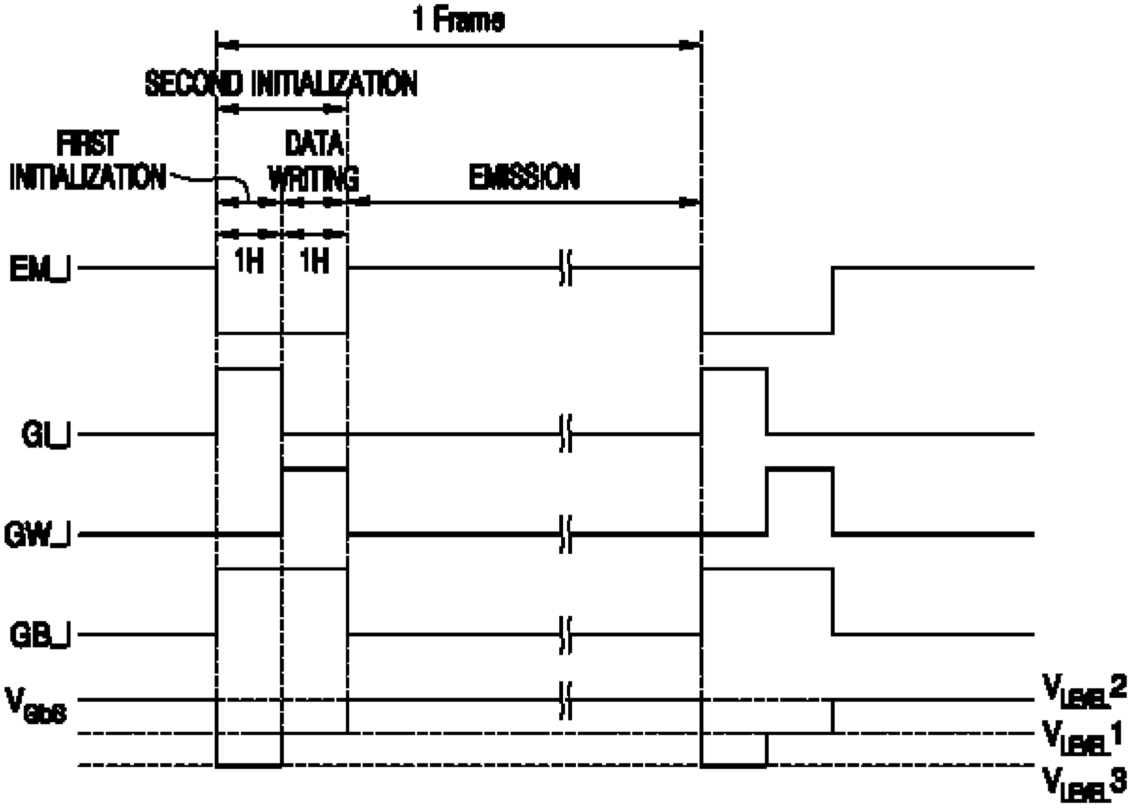
FIG. 3 shows an example of a timing diagram of control signals for operating a pixel circuit shown in FIG. 2 and a waveform of a lower gate-source voltage of a driving transistor.

FIG. 3 shows an example of a timing diagram of control signals for operating a pixel circuit shown in FIG. 2 and a waveform of a lower gate-source voltage of a driving transistor.

Referring to FIG. 3 together with FIG. 2, in a period in which the emission control signal EM_i has a low level, the first and second emission control transistors T5 and T6 are turned off. The period in which the emission control signal EM_i has a low level may be referred to as a non-emission period.

During the non-emission period, the driving transistor T1 stops an output of the driving current Id, and the display element OLED stops emitting light.

The second scan signal GI_i has a high level first. A period in which the second scan signal GI_i has a high-level pulse voltage may be referred to as a first initialization period.

During the first initialization period, the gate initialization transistor T4 is turned on, and the reference voltage VREF is applied to the upper gate Ga of the driving transistor T1, that is, the first electrode CE1 of the storage capacitor Cst.

After the second scan signal GI_i transitions to a low level again, the first scan signal GW_i has a high level. A period in which the first scan signal GW_i has a high-level pulse voltage may be referred to as a data writing period.

During the data writing period, the scan transistor T2 and the compensation transistor T3 are turned on, and the data voltage Dm_j is received at the source S of the driving transistor T1. The driving transistor T1 is diode-connected by the compensation transistor T3.

During a period in which the second scan signal GI_i has a high level and the first scan signal GW_i has a high level, the third scan signal GB_i may have a high level. A period in which the third scan signal GB_i has a high-level pulse voltage may be referred to as a second initialization period.

During the second initialization period, the anode initialization transistor T7 is turned on, and the initialization voltage VINT is applied to the anode of the display element OLED. By applying the initialization voltage VINT to the anode of the display element OLED to completely non-emit the display element OLED, a phenomenon in which the display element OLED emits fine light in response to a black gradation in a next frame may be eliminated.

Thereafter, the first scan signal GW_i and the third scan signal GB_i transition to a low level, and the emission control signal EM_i has a high level. A period in which the emission control signal EM_i has a high level may be referred to an emission period.

During the emission period, the first and second emission control transistors T5 and T6 are turned on. The driving transistor T1 may output the driving current Id, and the display element OLED may emit light with a luminance corresponding to magnitude of the driving current Id.

The second scan signal GI_i may be substantially synchronized with a first scan signal GW_i−1 of a previous row. A difference between a timing at which the second scan signal GI_i has a rising edge and a timing at which the first scan signal GW_i has a rising edge may be one horizontal scan period 1H.

In an embodiment, as shown in FIG. 3, the second initialization period may include the first initialization period and the data writing period. In other words, the second initialization period may overlap the first initialization period and the data writing period.

Although FIG. 3 illustrates that the second initialization period includes the first initialization period and the data writing period, this is only an embodiment, and various modifications are possible. In another embodiment, the second initialization period may include the data writing period. In other words, the second initialization period may overlap the data writing period.

A lower gate-source voltage $V_{GbS}$ of the driving transistor T1 may have a first voltage level $V_{LEVEL}1$ during the data writing period and a second voltage level $V_{LEVEL}2$ during the emission period.

In an embodiment, the first voltage level $V_{LEVEL}1$ may be less than the second voltage level $V_{LEVEL}2$.

For example, as described above in FIG. 2, the voltage applying circuit 160 may apply the initialization voltage VINT as the first voltage V1 to the lower gate Gb of the driving transistor T1 during the data writing period. The first voltage level $V_{LEVEL}1$ may be a difference VINT−Dm_j between the initialization voltage VINT and the data voltage Dm_j. In addition, the voltage applying circuit 160 may apply the anode voltage of the display element OLED, that is, the voltage of the anode electrode, as the second voltage V2 to the lower gate Gb of the driving transistor T1 during the emission period. At this time, because the anode voltage of the display element OLED and the source voltage of the driving transistor T1 may be substantially the same during the emission period, the second voltage level $V_{LEVEL}2$ may be substantially zero.

As in an embodiment of the present invention, by applying the first voltage V1 to the lower gate Gb of the driving transistor T1 during the data writing period, the lower gate-source voltage $V_{GbS}$ of the driving transistor T1 may be adjusted to adjust a threshold voltage Vth of the driving transistor T1. For example, by applying the first voltage V1 lower than the source voltage of the driving transistor T1 to the lower gate Gb of the driving transistor T1 during the data writing period, the threshold voltage Vth of the driving transistor T1 may be increased. By allowing the driving transistor T1 to have the threshold voltage Vth greater than zero, a leakage current generated during the data writing period may be reduced, and a difference Dm_j+Vth−VINT between a data compensation voltage Dm_j+Vth and the initialization voltage VINT may be stored in the storage capacitor Cst.

Low-frequency driving may be controlled by applying the second voltage V2 to the lower gate Gb of the driving transistor T1 during the emission period. The second voltage V2 may be a bias voltage.

As shown in FIG. 3, the lower gate-source voltage $V_{GbS}$ of the driving transistor T1 may have a third voltage level $V_{LEVEL}3$ in the first initialization period. The third voltage level $V_{LEVEL}3$ may be determined according to a data voltage Dm_j−1 applied to the pixel PXij of a previous frame, and the first voltage level $V_{LEVEL}1$ may be determined according to the data voltage Dm_j applied to the pixel PXij of a current frame.

FIG. 3 illustrates that the first voltage level $V_{LEVEL}1$ is greater than the third voltage level $V_{LEVEL}3$, but in another embodiment, the third voltage level $V_{LEVEL}3$ may be greater than the first voltage level $V_{LEVEL}1$. In still another embodiment, the first voltage level $V_{LEVEL}1$ and the third voltage level $V_{LEVEL}3$ may be substantially the same.

Figure 4:
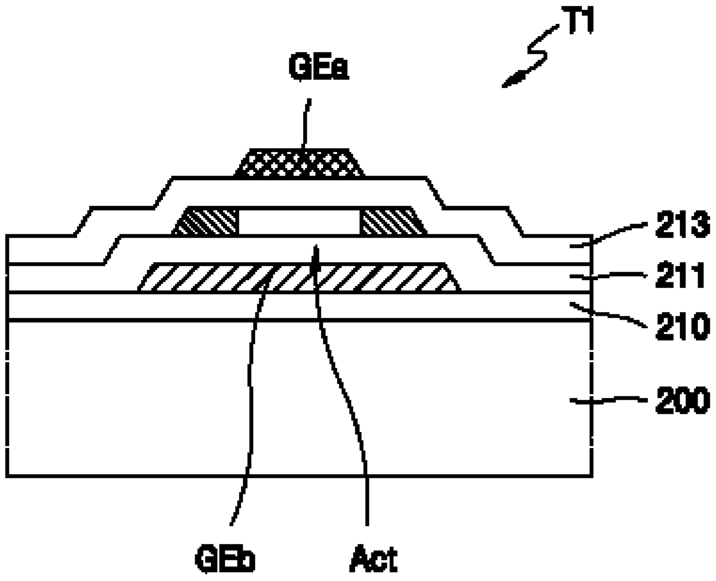
FIG. 4 is a cross-sectional view schematically illustrating a driving transistor according to an embodiment.

FIG. 4 is a cross-sectional view schematically illustrating the driving transistor T1 according to an embodiment.

Referring to FIG. 4, the driving transistor T1 may include a lower gate electrode GEb, a semiconductor layer Act, and an upper gate electrode GEa. The lower gate electrode GEb functions as the lower gate Gb of the driving transistor T1 of FIG. 2, and the upper gate electrode GEa functions as the upper gate Ga of the driving transistor T1 of FIG. 2.

Hereinafter, a configuration included in the driving transistor T1 will be described in more detail according to a stacked structure with reference to FIG. 4.

A substrate 200 may include a glass material, a ceramic material, a metal material, or a flexible or bendable material. When the substrate 200 is flexible or bendable, the substrate 200 may include a polymer resin, such as polyethersulfone, polyacrylate, polyetherimide, polyethylene naphthalate, polyethylene terephthalate, polyphenylene sulfide, polyarylate, polyimide, polycarbonate, or cellulose acetate propionate.

The substrate 200 may have a single-layered structure or a multi-layered structure and may further include an inorganic layer in the case of a multi-layered structure. In some embodiments, the substrate 200 may have a structure of organic material/inorganic material/organic material.

A buffer layer 211 may reduce or block penetration of foreign substances, moisture, or external air from a lower portion of the substrate 200. The buffer layer 211 may include an inorganic material, such as an oxide or a nitride, an organic material, or a composite of an organic material and an inorganic material, and may include a single-layered or multi-layered structure including the inorganic material and the organic material.

A barrier layer 210 may be further included between the substrate 200 and the buffer layer 211. The barrier layer 210 may prevent or minimize penetration of impurities from the substrate 200 or the like into the semiconductor layer Act. The barrier layer 210 may include an inorganic material, such as an oxide or a nitride, an organic material, or a composite of an organic material and an inorganic material, and may include a single-layered or multi-layered structure including the inorganic material and the organic material.

The semiconductor layer Act may be on the buffer layer 211. The semiconductor layer Act may include a single layer or a multilayer. The semiconductor layer Act may include a semiconductor area, and conductive areas respectively arranged on one side and the other side of the semiconductor area.

In an embodiment, the semiconductor layer Act may include an oxide semiconductor material. The semiconductor layer Act may include, for example, an oxide of at least one or more materials selected from a group including indium (In), gallium (Ga), tin (Sn), zirconium (Zr), vanadium (V), hafnium (Hf), cadmium (Cd), germanium (Ge), chromium (Cr), titanium (Ti), aluminum (Al), cesium (Cs), cerium (Ce), and zinc (Zn).

For example, the semiconductor layer Act may be an InSnZnO (ITZO) semiconductor layer, an InGaZnO (IGZO) semiconductor layer, or the like. Because an oxide semiconductor has a wide band gap (about 3.1 eV), high carrier mobility, and low leakage current, a voltage drop is not large even when a driving time is long, and a luminance change according to the voltage drop is not large even during low-frequency driving.

In another embodiment, the semiconductor layer Act may include amorphous silicon or polysilicon.

The lower gate electrode GEb may be between the substrate 200 and the buffer layer 211. The lower gate electrode GEb may at least partially overlap the semiconductor layer Act. The lower gate electrode GEb may include a conductive material including molybdenum (Mo), Al, copper (Cu), Ti, or the like, and may be a multi-layer or a single layer, each including the above-stated material.

As described above with reference to FIG. 2, the lower gate electrode GEb may be connected to the voltage applying circuit 160. The first voltage V1 may be applied to the lower gate electrode GEb during the data writing period, and the second voltage V2 may be applied to the lower gate electrode GEb during the emission period.

A gate insulating layer 213 may be provided on the buffer layer 211 to cover the semiconductor layer Act. The gate insulating layer 213 may include silicon oxide ($SiO_2$), silicon nitride ($SiN_X$), silicon oxynitride (SiON), aluminum oxide ($Al_2O_3$), titanium oxide ($TiO_2$), tantalum oxide ($Ta_2O_5$), hafnium oxide ($HfO_2$), zinc oxide (ZnOx), or the like. The zinc oxide ($ZnO_X$) may be zinc oxide (ZnO), and/or zinc peroxide ($ZnO_2$).

Although FIG. 4 illustrates that the gate insulating layer 213 is arranged on an entire surface of the substrate 200 to cover the semiconductor layer Act, as another embodiment, the gate insulating layer 213 may be patterned to overlap a portion of the semiconductor layer Act. For example, the gate insulating layer 213 may be patterned to overlap the semiconductor area of the semiconductor layer Act.

The upper gate electrode GEa may be on the gate insulating layer 213. The upper gate electrode GEa may at least partially overlap the semiconductor layer Act. For example, the upper gate electrode GEa may overlap the semiconductor area of the semiconductor layer Act. The upper gate electrode GEa may include a conductive material including Mo, Al, Cu, Ti, or the like, and may be a multi-layer or a single layer, each including the above-stated material.

Figure 5:
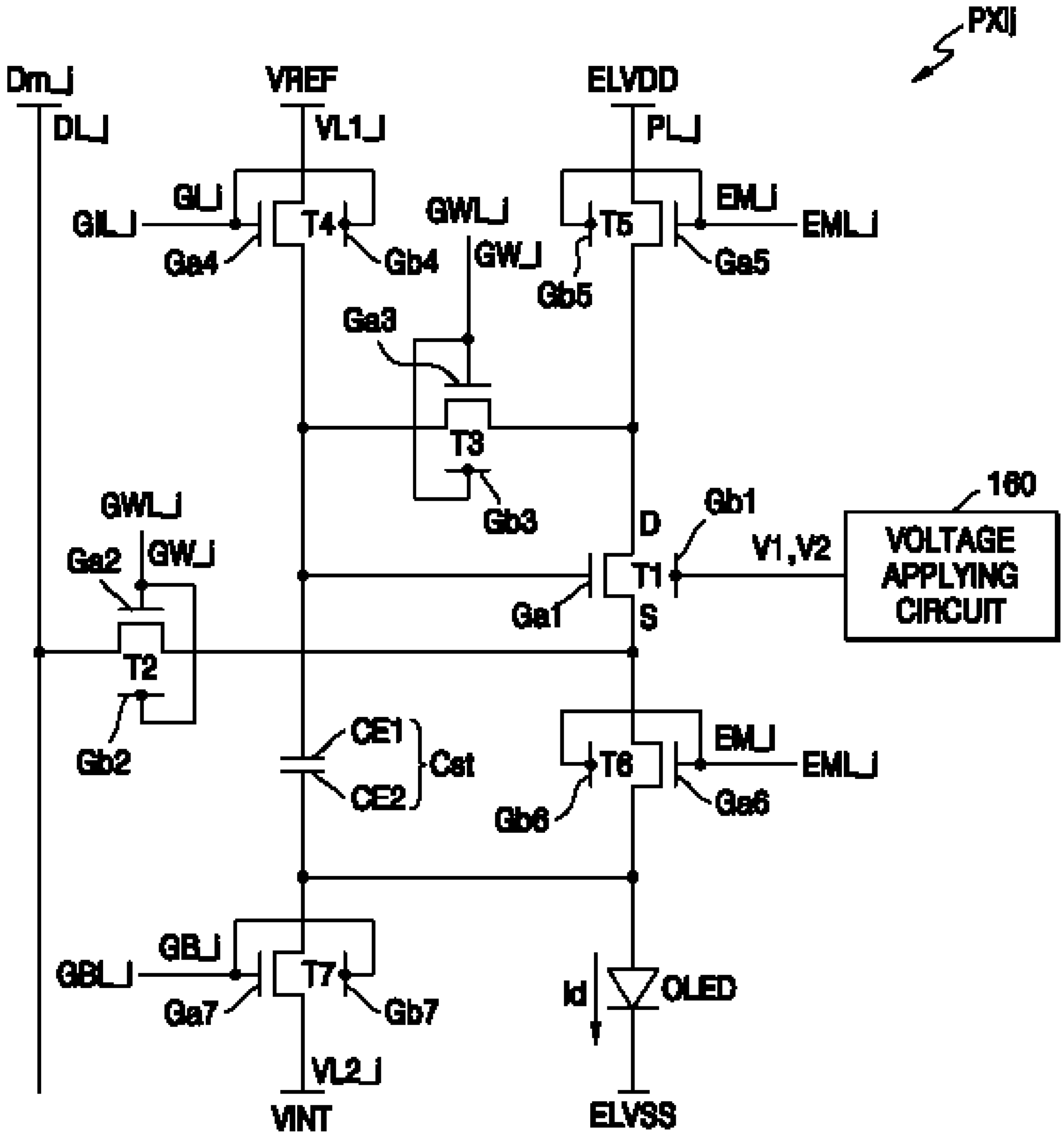
FIG. 5 is an equivalent circuit diagram of a pixel according to an embodiment.

FIG. 5 is an equivalent circuit diagram of the pixel PXij according to an embodiment. FIG. 5 is a modified embodiment of FIG. 2, and a difference thereof is in a structure of gates of each of the switching transistors. Hereinafter, overlapping contents will be replaced with the description of FIG. 2, and differences will be mainly described.

Referring to FIG. 5, the driving transistor T1 may have a first upper gate Ga1 and a first lower gate Gb1. The first upper gate Ga1 corresponds to the upper gate Ga of FIG. 2, and the first lower gate Gb1 corresponds to the lower gate Gb of FIG. 2. The first lower gate Gb1 may be connected to the voltage applying circuit 160.

Each of the switching transistors included in the pixel PXij may have an upper gate and a lower gate. For example, the scan transistor T2 may have a second upper gate Ga2 and a second lower gate Gb2. The compensation transistor T3 may have a third upper gate Ga3 and a third lower gate Gb3. The gate initialization transistor T4 may have a fourth upper gate Ga4 and a fourth lower gate Gb4. The first emission control transistor T5 may have a fifth upper gate Ga5 and a fifth lower gate Gb5. The second emission control transistor T6 may have a sixth upper gate Ga6 and a sixth lower gate Gb6. The anode initialization transistor T7 may have a seventh upper gate Ga7 and a seventh lower gate Gb7.

The upper gate and the lower gate of each of the switching transistors may be connected to each other. For example, the second upper gate Ga2 and the second lower gate Gb2 may be connected to each other, the third upper gate Ga3 and the third lower gate Gb3 may be connected to each other, the fourth upper gate Ga4 and the fourth lower gate Gb4 may be connected to each other, the fifth upper gate Ga5 and the fifth lower gate Gb5 may be connected to each other, the sixth upper gate Ga6 and the sixth lower gate Gb6 may be connected to each other, and the seventh upper gate Ga7 and the seventh lower gate Gb7 may be connected to each other. As such, when the upper gate and the lower gate of each of the switching transistors are connected to each other, electron mobility in a transistor may be improved.

Figure 6:
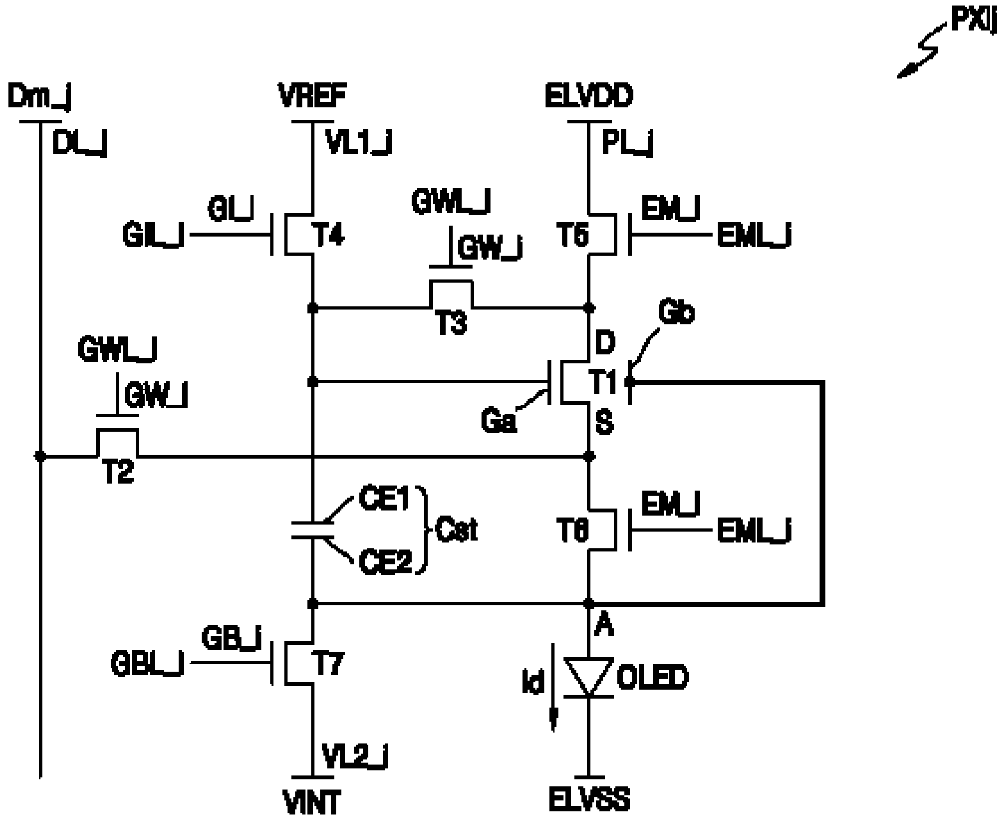
FIG. 6 is an equivalent circuit diagram of a pixel according to an embodiment.

FIG. 6 is an equivalent circuit diagram of the pixel PXij according to an embodiment. FIG. 6 is a modified embodiment of FIG. 2, and a difference thereof is in a structure of a lower gate of a driving transistor. Hereinafter, overlapping contents will be replaced with the description of FIG. 2, and differences will be mainly described.

Referring to FIG. 6, unlike FIG. 2, the lower gate Gb of the driving transistor T1 may be connected to an anode A of the display element OLED. When the lower gate Gb of the driving transistor T1 is connected to the anode A of the display element OLED, as shown in FIG. 3, the lower gate-source voltage $V_{GbS}$ of the driving transistor T1 may have the first voltage level $V_{LEVEL}1$ during the data writing period and the second voltage level $V_{LEVEL}2$ during the emission period.

In an embodiment, the first voltage level $V_{LEVEL}1$ may be less than the second voltage level $V_{LEVEL}2$.

For example, during the second initialization period, because the anode initialization transistor T7 is turned on and the initialization voltage VINT is applied to the anode A of the display element OLED, the initialization voltage VINT may be applied to the lower gate Gb of the driving transistor T1 connected to the anode A of the display element OLED. The first voltage level $V_{LEVEL}1$ may be a difference VINT−Dm_j between the initialization voltage VINT and the data voltage Dm_j. In addition, during the emission period, the second emission control transistor T6 may be turned on, so that an anode voltage of the display element OLED may be applied to the lower gate Gb of the driving transistor T1 connected to the anode A of the display element OLED. At this time, because the anode voltage of the display element OLED and the source voltage of the driving transistor T1 may be substantially the same during the emission period, the second voltage level $V_{LEVEL}2$ may be substantially zero. A difference between a potential of the lower gate Gb of the driving transistor T1 and a potential of the anode A of the display element OLED may be substantially zero.

As in an embodiment of the present disclosure, when the lower gate Gb of the driving transistor T1 is connected to the anode A of the display element OLED, the initialization voltage VINT is applied to the lower gate Gb of the driving transistor T1 during the data writing period, so that the lower gate-source voltage $V_{GbS}$ of the driving transistor T1 may be adjusted to adjust the threshold Vth of the driving transistor T1. For example, during the data writing period, the initialization voltage VINT, which is less than the source voltage of the driving transistor T1, is applied to the lower gate Gb of the driving transistor T1, so that the threshold voltage Vth of the driving transistor T1 may be increased. By allowing the driving transistor T1 to have the threshold voltage Vth greater than zero, a leakage current generated during the data writing period may be reduced, and a difference Dm_j+Vth−VINT between a data compensation voltage Dm_j+Vth and the initialization voltage VINT may be stored in the storage capacitor Cst.

Figure 7:
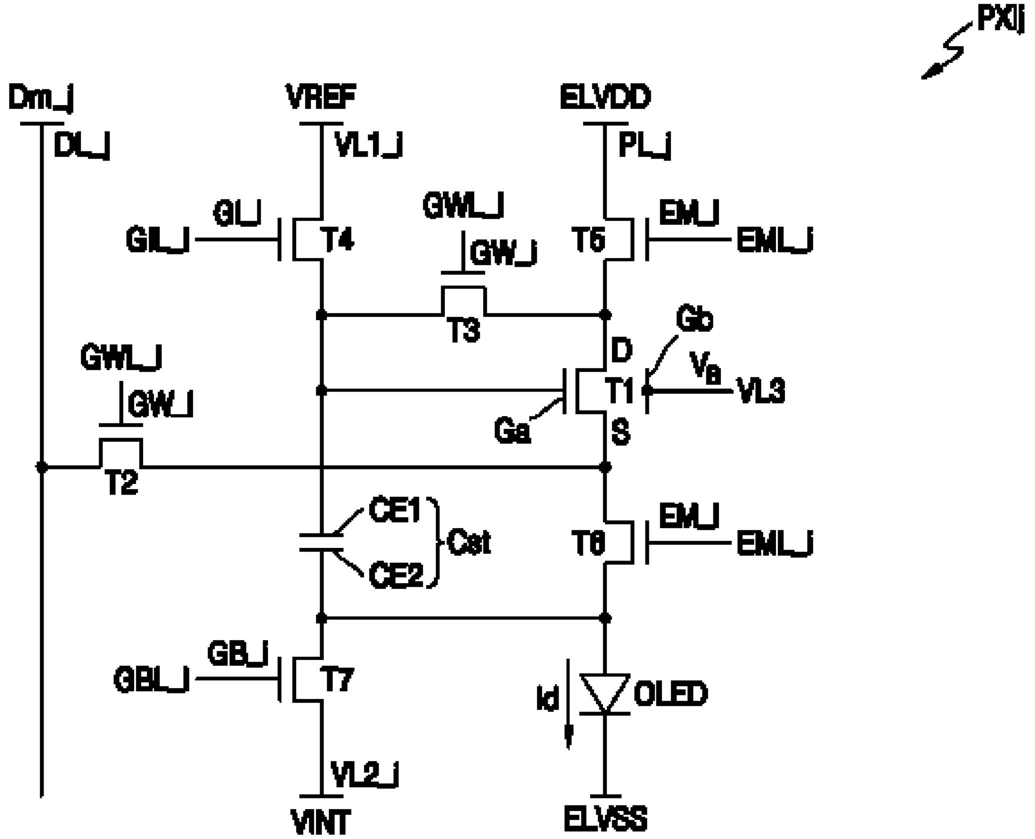
FIG. 7 is an equivalent circuit diagram of a pixel according to an embodiment.

FIG. 7 is an equivalent circuit diagram of the pixel PXij according to an embodiment. FIG. 7 is a modified embodiment of FIG. 2, and a difference thereof is in a structure of a lower gate of a driving transistor. Hereinafter, overlapping contents will be replaced with the description of FIG. 2, and differences will be mainly described.

Referring to FIG. 7, unlike FIG. 2, the lower gate Gb of the driving transistor T1 may be connected to a third voltage line VL3. The third voltage line VL3 may be configured to transmit a bias voltage VB to the lower gate Gb of the driving transistor T1.

When the bias voltage VB is applied to the lower gate Gb of the driving transistor T1 through the third voltage line VL3, a lower gate-source voltage of the driving transistor T1 may have a first voltage level during the data writing period and a second voltage level during the light emission period.

Figure 8:
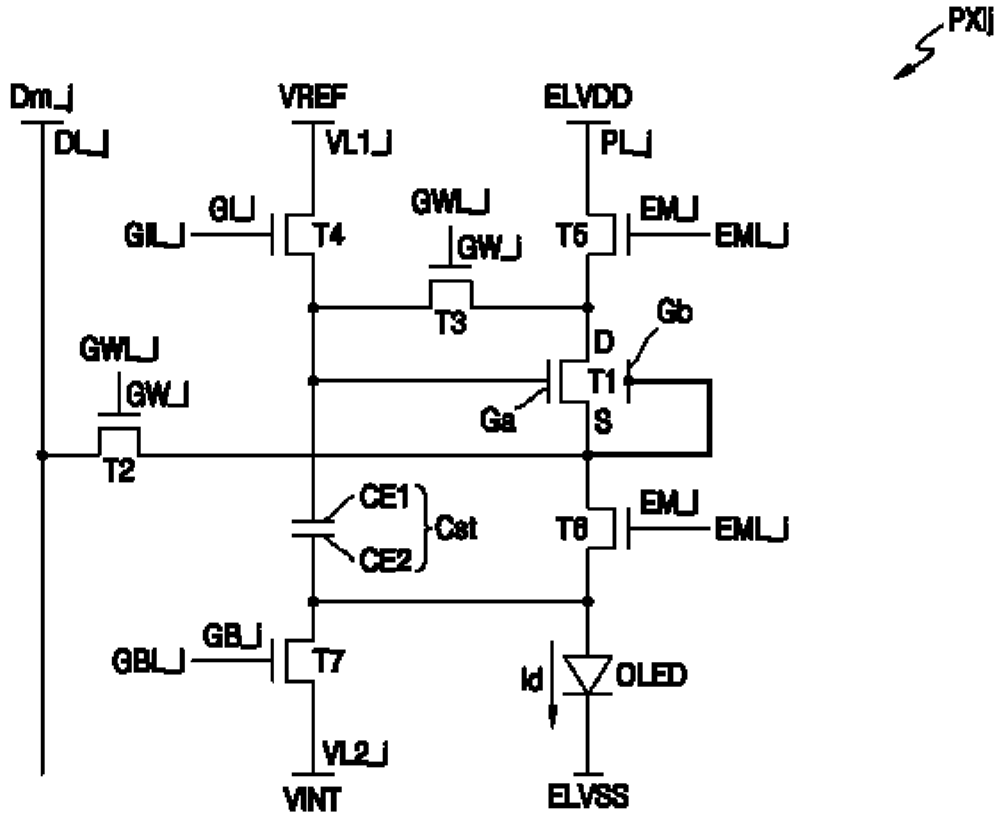
FIG. 8 is an equivalent circuit diagram of a pixel according to an embodiment.

FIG. 8 is an equivalent circuit diagram of the pixel PXij according to an embodiment. FIG. 8 is a modified embodiment of FIG. 2, and a difference thereof is in a structure of a lower gate of a driving transistor. Hereinafter, overlapping contents will be replaced with the description of FIG. 2, and differences will be mainly described.

Referring to FIG. 8, unlike FIG. 2, the lower gate Gb of the driving transistor T1 may be connected to the source S of the driving transistor T1. When the lower gate Gb of the driving transistor T1 and the source S of the driving transistor T1 are connected to each other, the lower gate-source voltage of the driving transistor T1 may be constant during the data writing period and the emission period. The lower gate-source voltage of the driving transistor T1 is zero during the data writing period and the emission period.

A pixel and a display apparatus are mainly described, but the inventive concepts are not limited thereto. For example, a pixel manufacturing method of manufacturing the pixel and a display apparatus manufacturing method of manufacturing the display apparatus also belong to the scope of the inventive concepts.

According an embodiment of the present invention as described above, a pixel capable of adjusting a threshold voltage of a driving transistor, and a display apparatus may be implemented.

Although certain embodiments and implementations have been described herein, other embodiments and modifications will be apparent from this description. Accordingly, the inventive concepts are not limited to such embodiments, but rather to the broader scope of the appended claims and various obvious modifications and equivalent arrangements as would be apparent to a person of ordinary skill in the art.

What is claimed is:

1. A pixel comprising:

a display element configured to emit light during an emission period and comprising an anode and a cathode;

a first transistor comprising an upper gate and a lower gate and configured to control a magnitude of a driving current flowing to the display element;

a storage capacitor connected to the upper gate of the first transistor;

a second transistor configured to be turned on during a data writing period to transmit a data voltage to the first transistor;

a third transistor configured to be turned on during the emission period to transmit a driving voltage to a drain of the first transistor; and a fourth transistor configured to be turned on during the emission period to connect a source of the first transistor to the anode of the display element, wherein a lower gate-source voltage of the first transistor has a first voltage level in the data writing period and a second voltage level in the emission period.

2. The pixel of claim 1, wherein the first voltage level is less than the second voltage level.

3. The pixel of claim 1, wherein the lower gate of the first transistor is connected to a voltage line configured to transmit a bias voltage.

4. The pixel of claim 1, wherein the lower gate of the first transistor is connected to the anode of the display element.

5. The pixel of claim 1, further comprising:

a fifth transistor configured to be turned on during the data writing period to connect the upper gate and the drain of the first transistor to each other;

a sixth transistor configured to be turned on during a first initialization period to transmit a reference voltage to the upper gate of the first transistor; and a seventh transistor configured to be turned on during a second initialization period to transmit an initialization voltage to the anode of the display element, wherein the second transistor is configured to transmit the data voltage to the source of the first transistor.

6. The pixel of claim 5, wherein the second initialization period comprises the data writing period.

7. The pixel of claim 6, wherein the second initialization period further comprises the first initialization period.

8. The pixel of claim 1, wherein the storage capacitor comprises a first electrode connected to the upper gate of the first transistor and a second electrode connected to the anode of the display element.

9. The pixel of claim 1, wherein the first transistor comprises an n-type metal-oxide-semiconductor field-effect transistor (MOSFET).

10. The pixel of claim 1, wherein the first transistor comprises a lower gate electrode operating as the lower gate, a semiconductor layer on the lower gate electrode, and an upper gate electrode arranged on the semiconductor layer and operating as the upper gate.

11. The pixel of claim 10, wherein the semiconductor layer comprises an oxide semiconductor material.

12. A pixel connected to a data line, a power line, a first voltage line, and a second voltage line, the pixel comprising:

a display element comprising an anode and a cathode;

a first transistor comprising an upper gate, a lower gate, a drain, and a source connected to the lower gate and configured to control a magnitude of a driving current flowing to the display element;

a storage capacitor comprising a first electrode connected to the upper gate of the first transistor and a second electrode;

a second transistor connected between the data line and the first transistor;

a fourth transistor connected between the first voltage line and the upper gate of the first transistor;

a fifth transistor connected between the power line and the drain of the first transistor;

a sixth transistor connected between the source of the first transistor and the anode of the display element; and a seventh transistor connected between the second electrode of the storage capacitor and the second voltage line.

13. The pixel of claim 12, further comprising a third transistor connected between the upper gate of the first transistor and the drain of the first transistor, wherein the second transistor is connected between the data line and the source of the first transistor.

14. The pixel of claim 12, wherein the same emission control signal is applied to a gate of the fifth transistor and a gate of the sixth transistor.

15. The pixel of claim 12, wherein the second electrode of the storage capacitor is connected to the anode of the display element.

16. The pixel of claim 12, wherein the first transistor, the second transistor, the fourth transistor, the fifth transistor, the sixth transistor, and the seventh transistor are NMOS transistors.

* * * * *